United States Patent [19]

Wakamatsu et al.

[11] Patent Number: 4,761,707

[45] Date of Patent: Aug. 2, 1988

[54] LIGHTNING-CONDUCTING INSULATORS

[75] Inventors: Keiji Wakamatsu, Chofu; Tetsuya Nakayama, Niwa; Jun Atsumi, Nagoya, all of Japan

[73] Assignees: The Tokyo Electric Co., Inc.; NGK Insulators, Ltd., both of Japan

[21] Appl. No.: 71,810

[22] Filed: Jul. 10, 1987

[30] Foreign Application Priority Data

Mar. 6, 1987 [JP] Japan .................................. 62-52641

[51] Int. Cl.[4] .............................................. H02H 9/04

[52] U.S. Cl. .................................... 361/127; 361/132; 174/139

[58] Field of Search .................................... 361/56-58, 361/91, 100, 111, 126, 127, 13 L; 174/140 R, 142, 141 R, 139; 338/21

[56] References Cited

U.S. PATENT DOCUMENTS 3,770,877 11/1973 Mashikian et al. ............ 361/126 X 3,963,858 6/1976 Cheng et al. ............... 174/140 R X

*Primary Examiner*—A. D. Pellinen

*Assistant Examiner*—Todd E. DeBoer

*Attorney, Agent, or Firm*—Parkhurst & Oliff

[57] ABSTRACT

A lightning-conducting insulator is disclosed, which comprises an insulator body consisting of a shed portion, a plurality of rib portions provided inside the shed portion, and a cup-like cylindrical head portion at a central upper portion of the shed portion, and a metal cap put and fixed onto the head portion, and a metal pin inserted and fixed inside the head portion. A cylindrical fitting section with a through hole is provided in the shed portion. At least one current-limiting element having a non-linear voltage-current characteristic is inserted into the through hole of the cylindrical fitting section. The cylindrical fitting section is sealed with a glass- and ceramics-bonding metal solder such that the upper and lower end faces of the current-limiting element and the end faces of the cylindrical fitting section may be continuously sealed.

7 Claims, 3 Drawing Sheets

LIGHTNING-CONDUCTING INSULATORS

BACKGROUND OF THE INVENTION (1) Field of the Invention

The present invention relates to suspension type lightning-conducting insulators which can speedily discharge, to the earth, a surge current applied to a power transmission line due to lightning, interrupt a follow current, prevent a problem that the power transmission line contacts the ground, and provide power to be transmitted again.

(2) Related Art Statement

Heretofore, it has been investigated to introduce lightning-conductors into power transmission lines so as to absorb the lightning and ON-OFF surges and prevent the ground-contacting problems of the power transmission lines. However, it is undesirable to attach lightning conductors having only a lightning-conducting function to the power transmission lines because the structure of iron towers for the power transmission lines and the insulating units becomes complicated. For this reason, suspension type lightning-conducting insulators have been proposed which have insulating and power transmission line-supporting functions as possessed by the conventional insulators and a lightning-conducting function of the lightning-conductors in combination. As such lightning-conducting insulators, NGK Insulators, Ltd. and The Tokyo Electric Co., Ltd. proposed lightning-conducting insulators in which a current-limiting element having a non-linear voltage-current characteristic is attached to a shed portion of an insulator body. In these lightning-conducting insulators, the current-limiting element is housed in a cylindrical fitting section, and an upper electrode and a lower electrode, each made of a cap-like metal member, are fitted and fixed to upper and lower ends of the cylindrical fitting section through packings. Further, the upper electrode is connected to a metal cap by a lead line, while the lower electrode is connected to a metal pin by a lead wire.

However, since the conventional lightning-conducting insulators fixed the upper and lower metallic electrodes to the cylindrical fitting section through the packings, the following problems were encountered.

It was difficult to maintain a gas-tightness of the inside of the cylindrical fitting section due to deterioration of the packing during use for an extended time period. When the gas-tightness is lowered, the current-limiting element is damaged so that it may become conducting when struck by lightning. Consequently, it becomes impossible to interrupt follow current subsequent to the lightning surge, resulting in the ground-contacting problems.

Furthermore, there have been proposed lightning-conducting insulators in which an insulating ceramic member is fitted to the cylindrical fitting section and lead wires are taken out from the current-limiting element therethrough. According to such lightning-conducting insulators, while adhesion between the cylindrical fitting section and the insulating ceramic member is good, it is necessary to make a cut portion through which the lead wires pass in the above insulating ceramic member so that a working operation is not only troublesome, but also a special technique is necessary for sealing the cut portion. Thus, a special contrivance was necessary for maintaining the reliability.

SUMMARY OF THE INVENTION

In order to solve the above-mentioned problems, the present invention employs a construction that a metal cap is put and fixed onto a cup-like cylindrical head portion formed at a central upper portion of a shed portion of an insulator body; a metal pin is inserted and fixed inside the head portion; a cylindrical fitting section having a through hole is provided in the shed portion; a current-limiting element having a non-linear voltage-current characteristic is inserted into the through hole; and the cylindrical fitting section is sealed with a conductive metal solder for bonding glass and ceramics such that the upper and lower end faces of the current-limiting element and the end faces of the cylindrical fitting section are continuously sealed with the metal solder.

According to the present invention, since the upper end face of the cylindrical fitting section and the upper end face of the current-limiting element are firmly bonded together with the glass- and ceramics-bonding metal solder which has good conductivity, the bonded face between the cylindrical fitting section and the current-limiting element and gas-tightness at the end faces of the current-limiting element can be ensured for an extended time period to prevent deterioration of the current-limiting element due to the gas sealing property and the elastic property even when the temperature varies or the insulator is left in temperature-varying conditions. Furthermore, since a cut portion through which the lead wires passes need not be formed in the solder, the structure of the insulator is simplified and the gas-tightness is improved while the reliability is enhanced.

Further, since the gas-sealing portion and the lead-joining portion are separately formed to prevent an external force exerted upon the lead from being applied to the sealing section, higher gas-tight reliability can be obtained.

These and other objects, features, and advantages of the invention will be appreciated upon reading of the following description of the invention when taken in conjunction with the attached drawings, with the understanding that some modifications, variations, and changes of the same could be made by the skilled person in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein:

FIG. 4 is a top view of a lightning-conducting insulator as an embodiment according to the present invention.

DETAILED DESCRIPTION OF THE INVENTION

An embodiment of the present invention will be explained with reference to FIGS. 1–4 below.

Figure 3:
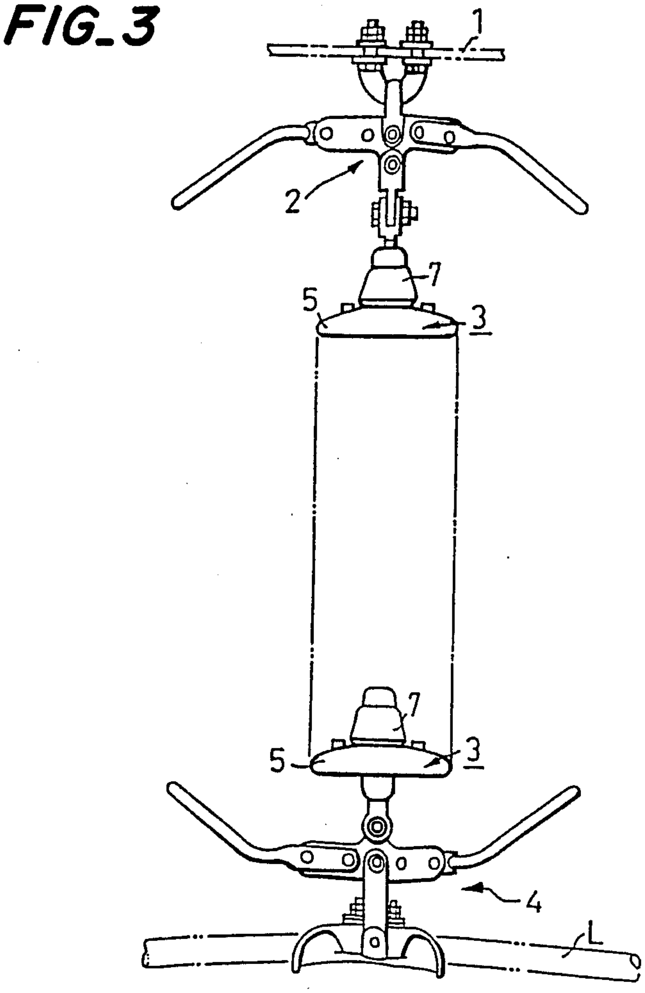
FIG. 3 is a front view illustrating a use state of the lightning-conducting insulators.

As shown in FIG. 3, a number of suspension type lightning-conducting insulators 3 are hanged and connected together in series from a supporting arm 1 provided at an iron tower (not shown) through a hanging metal member 2. A power transmission line L is supported at a lowermost end of the lightning-conducting insulators 3 through a hanging metal member 4.

Figure 2:
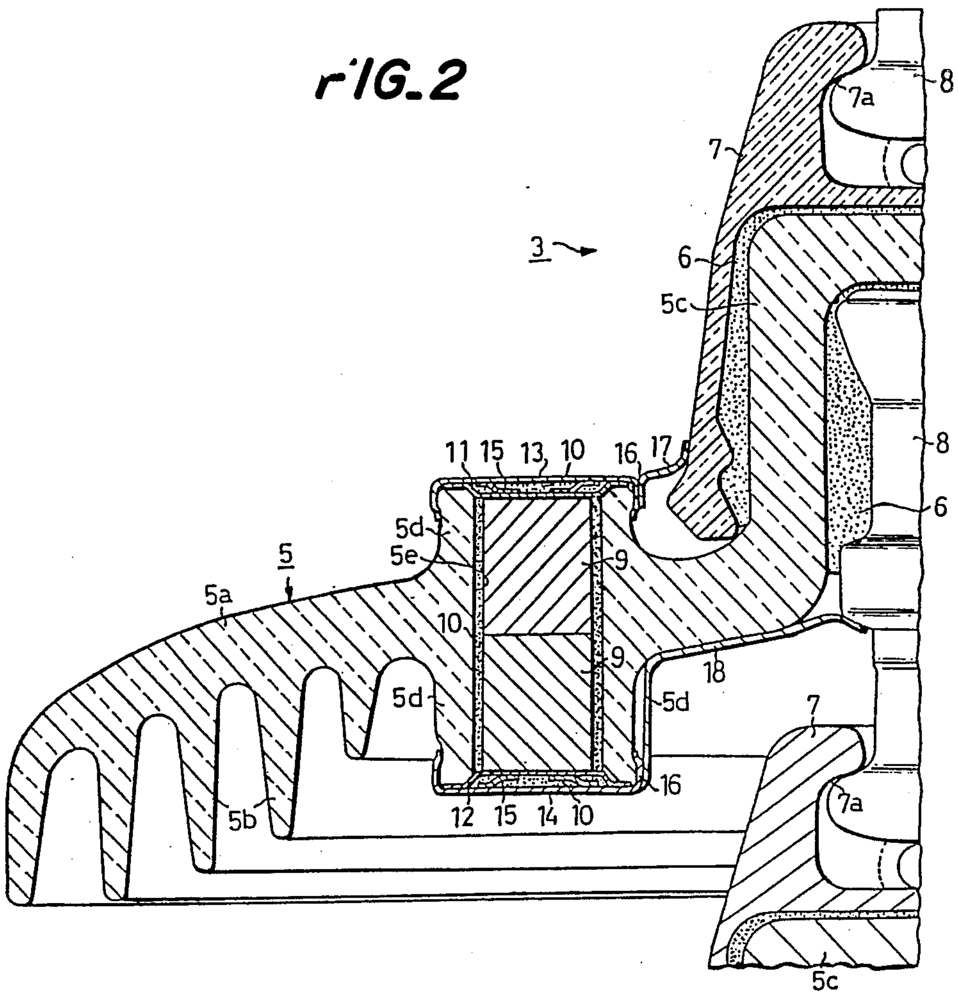
FIG. 2 is a half cross sectional view illustrating a current-limiting element.

As shown in FIG. 2, an insulator body 5 constituting a lightning-conducting insulator 3 is integrally formed by a shed portion 5*a*, a plurality of rib portions 5*b* which are annularly, concentrically formed inside the shed portion 5*a*, and a cup-like cylindrical head portion 5*c* integrally formed at a central upper portion of the shed portion 5*a*. A metal cap 7 is put and fixed onto the outer periphery of the head portion 5*c* with cement 6. The metal cap 7 is formed with a fitting recess 7*a* into which a metal pin 8 of an immediately upward lightning-conducting insulator 3 is to be engaged. An upper portion of the metal pin 8 is fixed to the inside of the head portion 5*c* with cement 6. The lower end portion of the metal pin is engaged with a fitting recess 7*a* of a metal cap of an immediately downward lightning-conducting insulator. In such a manner, a plurality of the lightning-conducting insulators 3 are connected together in series.

Figure 1:
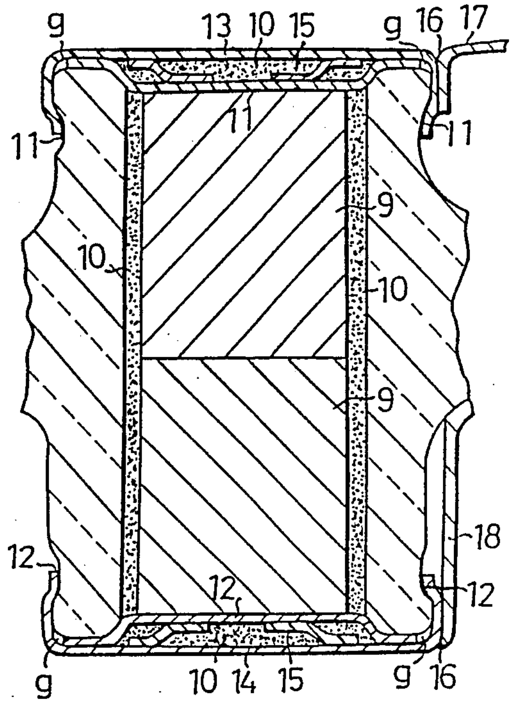
FIG. 1 is a partial cross sectional view illustrating a principal portion of a lightning-conducting insulator as an embodiment according to the present invention.

As shown in FIGS. 1–2 and 4, a plurality of cylindrical fitting sections 5*d* (at four locations in this embodiment) are integrally provided in the shed portion 5*a* at a circumferentially equal interval (angle) such that they penetrate the shed portion 5*a* in parallel with the metal pin 8. A plurality of column-like current-limiting elements 9 (two current-limiting elements in this embodiment) mainly composed of zinc oxide (ZnO) and having excellent follow current-interrupting performance and a non-linear voltage-current characteristic are inserted inside the cylindrical fitting section 5*d*, that is, a through hole 5*e* in series. A silicone rubber 10 as an elastic insulating material is inserted between the through hole 5*e* and the outer peripheral surface of the current-limiting elements 9 to bond them together. Instead of the silicone rubber, a glass having a low melting point may be filled to effect the bonding.

Glass- and ceramics-bonding conductive metal solder (manufactured by Asahi Glass Company Limited, Trade name: Cerasolza) at 11 and 12 is bonded and fixed to the upper and lower end faces of the current-limiting element 9 and the fitting cylindrical section 5*d* such that the current-limiting elements 9 may be sealed. The glass- and ceramics-bonding metal solder at 11 and 12 is a quaternary element alloy which is ordinarily composed mainly of a Pb-Sn alloy and to which Zn and Sb are added. The solder portions 11 and 12 can be directly firmly bonded to the surface of glass and ceramics without performing a special treatment thereon. However, it is effective to used supersonic waves for the bonding. A dipping vessel with a supersonic wave soldering trowel or a supersonic wave padding bath may be used. A highly reliable bonding can be effected in 1 to 3 seconds in the soldering work by means of a soldering trowel using a supersonic wave oscillator at 60 KHz and 15 W.

The gas tightness of the inside of the cylindrical fitting section 5*d* is improved by the above solder portions 11, 12.

The same material may be used for the solder portions 11 and 12. Since the soldering operation needs to be performed at the opposite ends of the current-limiting element, workability can be improved when different soldering materials are used for the solder portions 11 and 12, respectively. That is, the solder portions are formed on the upper and lower sides of the insulator. On the other hand, the soldering operation must be performed in the state that a portion of the insulator to be soldered may face upwardly and thus two soldering steps are necessary. In this case, if the soldering portions 11 and 12 are made of the soldering material having a single melting point, there may occur inconvenience that the formerly formed solder portion melts out when the latter solder portion is being formed. To the contrary, when the solder portions are made of different kinds of soldering materials having different melting points and the solder portion is first made of the soldering material having a higher melting point, the soldering operation can be easily performed.

By the above solder portions 11, 12, the gas tightness inside of the cylindrical fitting section 5*d* is improved and the current-limiting element 9 is prevented from being deteriorated with moisture. Cap-like upper and lower electrodes 13 and 14 are fitted to the cylindrical fitting section 5*d* to cover the ceramics-bonding metal solder portions 11 and 12, and are crawled to the cylindrical fitting section 5d at the outer peripheries thereof. Coned conductive dish springs 15 each made of a planar toroidal plate are interposed between the current-limiting elements 9 and the opposite electrodes 13 and 14 to electrically connect the current-limiting elements 9 with the upper electrode 13 and the lower electrode 14 while mechanically holding the current-limiting elements 9.

The above-mentioned silicon rubber 10 is filled inside the upper electrode 13 and the lower electrode 14, that is, in spaces for arranging the coned dish springs 15 therein. The silicon rubber 10 is also charged into small gaps "g" formed outside the fitting cylinder 5*d*. Thereby, the gas tightness between the ceramic-bonding metal solder portions 11 and 12 and the opposite electrodes 13 and 14 is assured. Further, the above ceramics-bonding metal solder is also charged into crawled portions of the opposite electrodes 13 and 14 to bond them.

One end of each of the lead wires 17 and 18 is bonded and fixed to the upper face of the upper electrode 13 or the lower face of the lower electrode 14 by means of a brazing or a pressure welding at 16. The other end of the upper lead wire 17 is connected to the metal cap 7, while the other end of the lead wire 18 is connected to the metal pin 8.

Next, the function of the thus constructed lightning-conducting insulator will be explained in the following.

When an excess voltage of a lightning surge is applied to the current transmission line L, current flows to the metal pin 8 of the lowermost lightning-conducting insulator 3 through the hanging metal member 4, and is transmitted from the lead wire 18, the lower electrode 14, the coned dish spring 15, the ceramics-bonding metal solder portion 12, the current-limiting elements 9, the ceramics-bonding metal solder 11, the coned dish spring 15, the upper electrode 13, the lead wire 17, to the metal cap 17 in this order. Then, the current is transmitted from the metal cap 7 to the metal pin 8 of the lightning-conducting insulator 3 located immediately thereabove. In the same manner, the current is transmitted to a plurality of the lightning-conducting insulators connected together in series. Lastly, the current is earthened to the ground through the metal cap 7 of the uppermost lightning-conducting insulator 3, the supporting member 2 and the supporting arm 1.

At that time, a resistance value of the insulator body 5 is speedily reduced by the current-limiting elements housed in the insulator body 5 due to their current-limiting characteristic to discharge the large current due to the lightning surge. On the other hand, with respect to the follow current subsequent to the lightning surge, the current-limiting elements 9 immediately restore their resistance value to restore the insulation. Thus, the discharge of the follow current is restrained and interrupted so that the power transmitting line is restored to an ordinary state.

In the illustrated embodiment according to the present invention, since the upper and lower end faces of the cylindrical fitting section 5*d* and the end faces of the current-limiting elements 9 are sealed and fixed by means of the ceramics-bonding metal solder at 11 and 12, the gas tightness inside the cylindrical fitting section 5*d* is enhanced so that the current-limiting elements 9 are prevented from being deteriorated with moisture and durability of the current-limiting elements 9 increases with an improved reliability. Further, the structure of the insulator can be simplified. In addition, since the above glass- and ceramics-bonding metal solder portions 11, 12 have high followability against expansion and contraction, the gas tightness inside the cylindrical fitting section can be prevented from being lowered due to expansion of the cylindrical fitting section and the current-limiting elements 9. Furthermore, there is no need to provide a cut portion in the upper and lower electrodes 13 and 14 through which the lead wires 17 and 18 pass. In this respect, it is possible to maintain the gas tightness, increase the reliability, simplify the structure and attain easy production.

In the illustrated embodiment, the cylindrical fitting section 5*d* and the current-limiting elements 9 are bonded and fixed together by means of the silicone rubber. In this case, even if the current-limiting element 9 reaches high temperatures by being heated instantly for a very short time around 10 to 200 microseconds due to a lightning surge or an ON-OFF surge, the silicone rubber 10 absorbs thermal expansion of the current-limiting elements 9 so that an excess stress may be refrained from acting upon the cylindrical fitting section 5*d* and the cylindrical fitting section may be prevented from being cracked and broken.

The present invention is not limited to the above-mentioned embodiment, and the following modifications may be made.

(1) Fitting cylindrical sections 5*d* into which two, three, four, five or more current-limiting elements are disposed may be arranged in the shed portion of the insulator body circumferentially at an equal angle.

(2) The cylindrical fitting sections 5*d* are formed separately from the insulator body, or formed with their upper faces being the same level as that of the shed portion 5*a*.

(3) The upper electrodes and the lower electrodes are formed by thickening the glass- and ceramics-bonding metal solder portions 11, 12, and the lead wires 17 and 18 are connected thereto.

As having been explained in the aforegoing, according to the present invention, since the cylindrical fitting section and the current-limiting elements are sealed with the ceramics-bonding metal solder, it is possible that the gas tightness inside the cylindrical fitting section for housing the current-limiting elements is maintained, so that the current-limiting elements can be prevented from being damaged with moisture and durability and reliability can be improved. Further, since a cut portion through which the lead wires are inserted need not be formed, unlike in the prior art techniques, the structure of the insulator can be simplified and the gas tightness can also improved. In this point, the reliability is also be enhanced.

What is claimed is:

1. A lightning-conducting insulator comprising an insulator body which comprises a shed portion, a plurality of annular rib portions provided inside the shed portion, and a cup-like cylindrical head portion at a central upper portion of the shed portion, a metal cap put and fixed onto the head portion, and a metal pin inserted and fixed inside the head portion, wherein a cylindrical fitting section with a through hole is provided in said shed portion, a current-limiting element having a non-linear voltage-current characteristic is inserted into the through hole, the cylindrical fitting section is sealed with a glass- and ceramics-bonding conductive metal solder such that upper and lower end faces of the current-limiting element and end faces of the cylindrical fitting section may be continuously sealed.

2. A lightning-conducting insulator according to claim 1, wherein the melting point of the glass- and ceramics-bonding metal solder at the upper end face of the upper end face of the current-limiting element differs from that of the metal solder at the lower end face thereof.

3. A lightning-conducting insulator according to claim 1, wherein a plurality of the cylindrical fitting sections in which the current-limiting element is inserted are provided in the shed portion of the insulator body circumferentially at an equal angle.

4. A lightning-conducting insulator according to claim 1, wherein cap-like upper and lower electrodes are fitted to the cylindrical fitting section to cover the metal solder at the upper and lower end faces of the cylindrical fitting section.

5. A lightning-conducting insulator according to claim 1, wherein a lead wire is connected to the cap-like upper electrode at one end and to the metal cap at the other end, while a lead wire is connected to the lower electrode at one end and to the metal pin at the other end.

6. A lightning-conducting insulator according to claim 4, wherein coned dish springs are interposed between the upper and lower electrodes and the metal solder at the upper and lower end faces of the cylindrical fitting section, respectively.

7. A lightning-conducting insulator according to claim 1, wherein an elastic insulating material is filled between the inner periphery of the through hole and the current-limiting element.

* * * * *